Patented Jan. 19, 1943

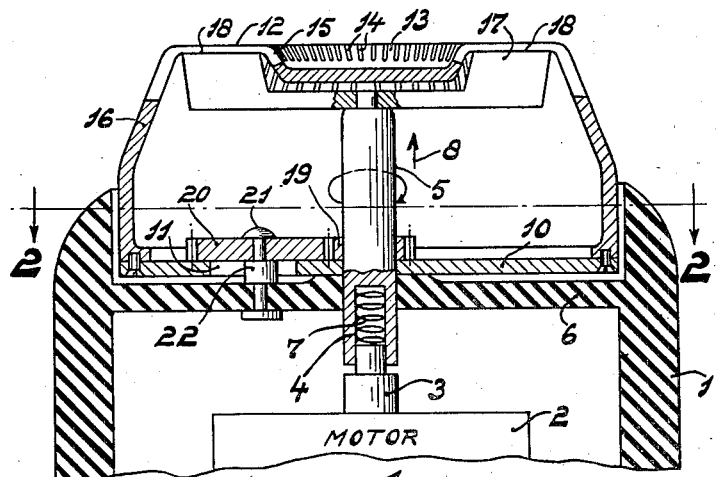

2,308,920

UNITED STATES PATENT OFFICE 2,308,920

HAIR CUTTING DEVICE

Alexandre Horowitz and Alexis van Dam, Eindhoven, Netherlands, assignors, by mesne assignments, to Hartford National Bank and Trust Company, Hartford, Conn., as trustee Application February 23, 1940, Serial No. 320,484
In Germany February 23, 1939

4 Claims. (Cl. 30—43)

The present application, which is a continuation-in-part of our co-pending U. S. application S. N. 303,290, filed November 7, 1939, patented May 19, 1942, No. 2,283,834, relates to hair cutting or shaving devices having a shaving head consisting of an apertured, for instance slitted, cutting or shear plate and a rotary, preferably electrically-driven, cutter.

In our above-mentioned application we proposed to move the shear plate, for instance rotate the same, at a speed which is much less than that of the cutter in order that the hairs may be caught in the slits and cut in a better manner than in devices using a stationary cutting plate. However, we have found that when the plate is rotated continuously, it frequently happens that some hairs are not cut.

The object of the present invention is to overcome the above difficulty and for this purpose and in accordance with the present invention we give the cutting plate an oscillatory movement in its plane about the driving shaft of the cutter.

The cutting plate is preferably provided with radial slits which terminate, for instance at the periphery and in a central depression of the plate. In such cases the amplitude of oscillation of the cutting plate may correspond to at least the width of one of the strips of the plate between two successive slits, but preferably the amplitude is made substantially equal to the pitch of the slits. We have found that an oscillation frequency of about 100 to 500 oscillations a minute with a cutter speed of about 6,000 to 12,000 R. P. M. gives very good cutting results.

In order that the invention may be clearly understood and readily carried into effect, we shall describe the same in more detail with reference to the accompanying drawing in which, Figure 1 is a sectionized side-view of a portion of an electric shaver embodying the invention, and Fig. 2 is a section along line 2—2 of Figure 1.

The shaver illustrated in the drawing comprises a hollow housing 1 of insulating material such as "Bakelite," in which is supported an electric motor 2 having a shaft 3. Shaft 3 has a flattened end which fits into a slot 4 in the end of a shaft 5 extending through the end wall 6 of the housing. A compression spring 7 located within slot 4 presses shaft 5 in the direction of arrow 8.

Mounted on a boss of the end wall 6 and rotatable about the shaft 5 is a metal disc 10 provided with a radial slot 11 for a purpose later to be described. Secured to the periphery of disc 10 is a metal cup-shaped member or shear plate 12 whose upper end has a central depression or cavity 13 which forms an annular portion provided with a large number of radial or substantially radial slits 14. The slits 14, which may have a width of about 0.2 mm., extend through the annular portion and through the wall 15 of cavity 13 and the outer wall 16 of member 12. The slits may be widened at their ends to guide the hair into the same.

Mounted upon the outer end of shaft 5 is a cutter 17 having two cutting edges 18 which are pressed against the inner surface of the annular portion of member 12 by the spring 7. As shown the cutter 17 has two diametrically-opposite cutting edges, but, we prefer to use three cutting edges located 120° apart because this uniformly distributes the pressure on the annular portion of member 12. The edges 18 preferably make a sharp angle with the edges of the slits 14.

In accordance with the invention, the shear plate 12 is oscillated in its plane and for this purpose a gear 19 fixedly-mounted on shaft 5 drives a larger gear 20. Gear 20 is fixedly-mounted on a shaft 21 which is rotatably mounted on the end wall 6. The portion of shaft 21 between gear 20 and the end wall 6 is shaped as an eccentric 22 which engages the slot 11 in the disc 10 (see Fig. 2).

By changing the ratio of gears 19 and 20, the number of oscillations per minute of the shear plate 12 can be changed, and by varying the eccentricity of portion 22 and/or changing its distance from the axis of shaft 5 it is possible to change the amplitudes of the oscillations. As stated we prefer to oscillate the shear plate with about 100 to 500 oscillations per minute when cutter 17 has a speed of about 6,000 to 12,000 R. P. M. and make the amplitudes of the oscillations at least equal to the distance between two of the adjacent slits 14. The amplitudes of the oscillations of the shear plate however are preferably made at least equal to the pitch of two successive slits 14.

Although we have described our invention with reference to specific examples and applications we do not desire to be limited thereto because obvious modifications will appear to one skilled in the art.

What we claim is:

1. In a hair-cutting device, a shear plate provided with a large number of apertures adapted to receive the hair to be cut, a cutter cooperating with said shear plate, means to rotate said cutter including a driving shaft, and means to rotatively oscillate said shear plate in its plane about the driving shaft of the cutter.

2. In a dry-shaving device, a shear plate provided with a large number of interspaced slits adapted to receive the hair to be cut, a cutter cooperating with said shear plate, means to move said cutter at a high speed, and means to vibrate said shear plate at a slow speed and with an amplitude exceeding the distance between two successive slits.

3. In a hair-cutting device, a shear plate provided with a large number of apertures adapted to receive the hair to be cut, a cutter cooperating with said shear plate, means to rotate said cutter at a high speed including a motor, and means driven by said motor to rotatively oscillate said shear plate.

4. In a hair-cutting device, a shear plate provided with a large number of substantially radially-extending slits adapted to receive the hair to be cut, a cutter cooperating with said shear plate, means to rotate said cutter at a high speed including a motor, and means including said motor to rotatively oscillate said shear plate at a speed between about 100 and 500 oscillations per minute and with an angular amplitude at least equal to the annular distance between two successive slits, preferably equal to the pitch of two successive slits.

ALEXANDRE HOROWITZ.
ALEXIS van DAM.